April 4, 1967 E. H. LAND 3,312,781

COLOR DISPLAYS FROM TRIPLE LIGHTNESS-DISTRIBUTION IMAGES

Filed March 8, 1965

2 Sheets-Sheet 1

INVENTOR

Edwin H. Land

BY Brown and Mikulka and Robert F. Peck and James E. Mrose

ATTORNEYS

April 4, 1967 E. H. LAND 3,312,781

COLOR DISPLAYS FROM TRIPLE LIGHTNESS-DISTRIBUTION IMAGES

Filed March 8, 1965 2 Sheets-Sheet 2

INVENTOR
Edwin H. Land

BY Brown and Mikulka
and
Robert T. Peck
and
James E. Mrose
ATTORNEYS

United States Patent Office 3,312,78:

Patented Apr. 4, 196'

3,312,781

COLOR DISPLAYS FROM TRIPLE LIGHTNESS-DISTRIBUTION IMAGES

Edwin H. Land, Cambridge, Mass., assignor to Polaroid Corporation, Cambridge, Mass., a corporation of Delaware Filed Mar. 8, 1965, Ser. No. 437,675
28 Claims. (Cl. 178—5.4)

The present invention relates to improvements in the production of displays in color, and, in one particular aspect, to novel and improved color television apparatus involving unique and advantageous reproductions of three color-separation images in terms of non-classical primary light emissions from phosphors which are economically and simply arranged, and offering compatibilities with conventional three-color and black-and-white television transmissions.

In conformity with classical theories relating to color and its perception, reproductions of subjects in color have been approached routinely by resolving discrete incremental areas of the broad-area subject in terms of three primary-color components and by attempting to duplicate, as closely as possible, each of these discrete incremental areas with the same primary colors in the same proportions. Conventional three-color television systems provide a typical example of this straight-forward point-by-point approach; there, each element of a scene is separately viewed by three cameras each responding to a different one of its three (red, green and blue) primary-color contents, and, at a receiving site, electrical signals characterizing the camera detections for each point in the scene are translated into excitations of one or more of three phosphors (respectively emitting red, green and blue light) which serve a corresponding elemental area of the picture tube screen. Typically, viewing-screen phosphors comprise minute dots arrayed in tri-angular clusters of three, and electron beams from three guns slaved with different ones of the three cameras are guided through a high-precision apertured shadow mask to impinge upon the different phosphor dots and thereby cause each emission of a different-color light from each of them to be in as direct a relation as possible to the amount of that same color which is present at a corresponding point in the televised scene. Successful commercialization of equipment involving the highly intricate and critical aperture-mask and dot-arrray assemblies has acclaimed the remarkable engineering and production triumphs which they represent; nevertheless, the inevitable search for greater economy, lesser criticality, and better quality has also continued and has lead to a number of proposals which, in particular, would obviate the need for these highly complex features. Multi-stripe and multiple-layer screens have been thought to be promising alternatives, with the latter holding the great attraction that each of the three light-emitting materials needed to produce a different one of the primary colors may be introduced as a separate and substantially continuous broad-area layers or film near the face of a picture tube. Through proper selection of screen materials and control of electron-accelerating potentials, each of the layers may theoretically be individually excited into emission of a different primary-color light output to the exclusion of any significant light from any of the other layers. As a practical matter, it is difficult to realize accurate color matching in this way, largely because the unavoidable emissions from more than one layer at a time produce contaminations of desired color purity at any instant; these purity deficiencies, as well as other obstacles to the production of the three colors in just the right proportions or ratios so that they will combine in each elemental area to reproduce the same color as that at a related point in the televised scene, tend to limit rather narrowly the color qualit available from such television equipment.

In accordance with the present teachings, however, im provements in the production of displays involving thre colors may be realized through practices which uniquel and advantageously recognize and assimilate certain nev theoretically explanations or subjective color perceptior It has been shown that many color phenomena cannot b satisfactorily explained within the framework of classica Newtonian theory. The inventions described herein ar the result of assimilations of a theory of color vision tha is consistent with all color phenomena tested. The basi premise of this theory is that color is determined by th correlation of lightness values on several "retinexes."

The word "retinex" describes a proposed retinal-cele bral liaison between an integral set of receptors which i predominantly sensitive to a given region of the visibl spectrum and nerve elements farther along the visua pathway, this liaison acting to form a monochromati image. The meaningful information for color perceptio contained in this image is the apparent lightness whicl it records for each object in a scene viewed by the eye Apparent lightness is not necessarily determined by th amount of light that is coming from each object, but i determined by the relations between each object an other objects in the scene. The several retinexes whicl respond to different portions of the spectrum and the light nesses in the images which each of these retinexes forn are correlated or compared to give the sense of color.

Since the correlation of the apparent lightnesses on th different "retinexes" determines color, since the apparen lightness of an object for that "retinex" is substantiall independent of the amount of light from that object, i follows that the color of an object need not depend on th relative amounts of light which it reflects from differen parts of the spectrum. Also as long as the "retinexes" ar able to form separate sets of lightness information, ther is considerable freedom in the choice of wavelength which may be used to send an image to the eye. Thes principles aid in understanding the operating mode o unique television apparatus herein disclosed, which apparatus is inherently simpler than conventional apparatu based on classical color theory.

As is discussed later herein in connection with improved television apparatus, reproductions in color ar meritoriously developed without restriction to classica primary light emissions and without critical point-by-point ratioing of light emissions from different phosphors.

It is one of the objects of the present invention, therefore, to improve the production of displays in substantially full color by establishing three coordinated image which involve non-classical "primary colors" and have different lightness distributions representing the sam subject.

Another object is to provide unique and improved displays wherein subjects are perceived in substantially full color through the agency of three representations characterizing three different lightness distributions thereof in visible light having different spectral distributions.

A further object is to provide novel and highly stable multicolor electronic displays in which three distinctive visible light patterns involving uncommon wavelengths advantageously characterize the lightness distributions in a scene and thereby promote perception in substantially full and agreeable color without requiring the usual brightness balancing of conventional systems.

Still further it is an object to provide color television apparatus of uncomplicated form and unorthodox operation which lends itself to economical manufacture and to compatibility with standard three-color and black-and-white transmissions, and which involves three layers of light-emissive materials advantageously admitting of certain simultaneous excitations to reproduced color-separation images and to develop highly stable colors.

In addition, it is an object to provide substantially full-color compatible television equipment of inexpensive construction wherein all of three layers of light-emissive material are simultaneously stimulated into emissions to characterize a first color-separation image, wherein two of the layers are simultaneously emissive to characterize a second of three color-separation images, and wherein one of the color-separation images is reproduced in substantially white light rather than a conventional primary.

By way of a summary account of practice of this invention in one of its aspects, the scenes viewed by camera equipment of a television transmitting station are translated into three conventional color-separation images, through different optical filters such as those which selectively pass the customary red, green and blue contents of the scene to three different image orthicon pickup tubes associated with the camera equipment. At a receiving site, characterizing electrical signals corresponding to those generated by the three image orthicon tubes are duplicated for purposes of controlling the intensities of an electron beam which scans a unique screen target assembly disposed at the face end of a picture tube, and, in accordance with one technique of scanning, each of the color-coded signals derived from a different one of the three camera tubes is applied in control of the intensity of an electron beam such that the scanning of the target assembly is at different times modulated in conformity with the lightness characteristics of the televised scene as viewed through a different filter by a different one of the camera pickup tubes. One suitable construction of the picture tube target or faceplate involves three superposed phosphor screen layers, the phosphors of these layers being stimulated into light emission by electrons supplied from a single gun and selectively accelerated to different velocities by different anode potentials. In one construction, the innermost layer, nearest the gun, comprises a phosphor which emits substantially blue light when stimulated by electrons from the electron gun having at least a predetermined minimum kinetic energy, and thus layer is independently excited into light emissions which are modulated in accordance with the lightness distribution of the scene as televised through the blue filter. The intermediate layer, next removed from the electron gun, comprises a phosphor which emits substantially red light when stimulated by electrons from the gun having at least a predetermined intermediate kinetic energy; this and the innermost layer are simultaneously excited into their characteristic light emissions while having their light outputs modulated in accordance with the lightness distribution of the scene as televised through the red filter. A phosphor which emits substantially green light is selected for the third layer, nearest the faceplate and most remote from the electron gun, and this phosphor together with the other two, causes the viewer to preceive substantially white light when all three layers are excited by electrons from the gun having at least a predetermined maximum kinetic energy; at such times, all three of these layers have their light outputs modulated in accordance with the lightness distributions of the scene as televised through the green filter.

In this system, images corresponding to the images which the "retinexes" would separate out of a panchromatic scene are recorded by conventional orthicon tubes. One such separation image is sent to the eye with wavelengths that correspond approximately to the spectral sensitivity of one of the "retinexes." The second set of lightness scale information recorded by another orthicon tube through filter is sent to the eye with a light that corresponds approximately to the sum of the spectral distributions of two "retinexes." The third set of lightness scale information recorded by an orthicon tube through a filter is sent to the eye with a spectral distribution of light that corresponds approximately to the sum of the spectral sensitives of three "retinexes." Even though the rank order of lightness steps recorded by the three orthicon tubes will be changed to varying extents by diluting lightness scale information, the difference in lightness will be such that the colors in the reproduced scene will be substantially those of the subject.

Although the features of this invention which are considered to be novel are set forth in the appended claims, further details concerning preferred practices of the invention, as well as the further objects and advantages thereof, may be most readily comprehended through reference to the following description taken in connection with the accompanying drawings, wherein:

Figure 4:
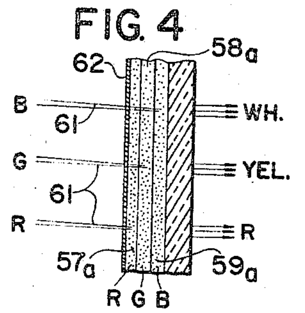
Figure 5:
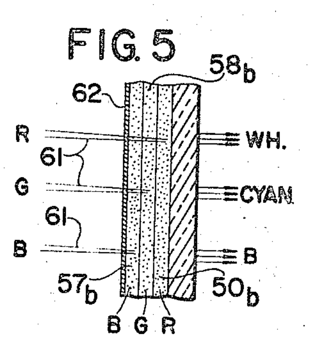
Figure 6:
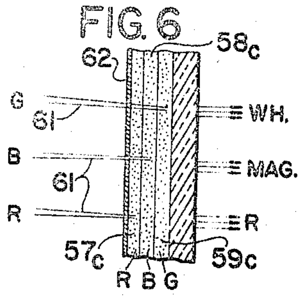
Figure 7:
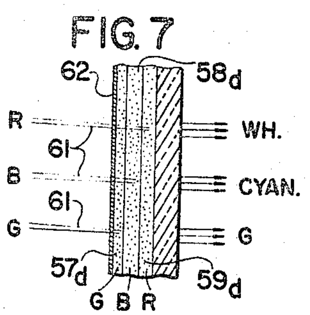
Figure 8:
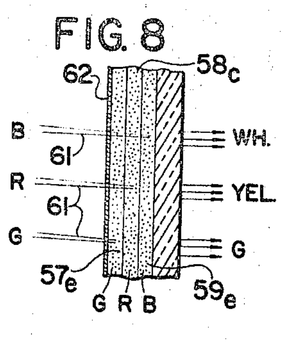

FIG. 4 provides a like cross-section wherein layers each emitting substantially red, green and blue light are stimulated to produce lightness-distribution images in terms of substantially white, yellow and red wavelengths of light;

FIG. 5 provides a like cross-section of a three-layer screen wherein the lightness-distribution images are produced in terms of substantially white, cyan and blue wavelengths;

FIG. 6 provides a like cross-section of a three-layer screen wherein the lightness-distribution images are produced in terms of substantially white, magenta and red wavelengths;

FIG. 7 provides a like cross-section of a three-layer screen wherein the lightness-distribution images are produced in terms of substantially white, cyan and green wavelengths; and FIG. 8 provides a like cross-section of a three-layer screen wherein the lightness-distribution images are produced in terms of substantially white, yellow and green wavelengths of light.

Figure 1:
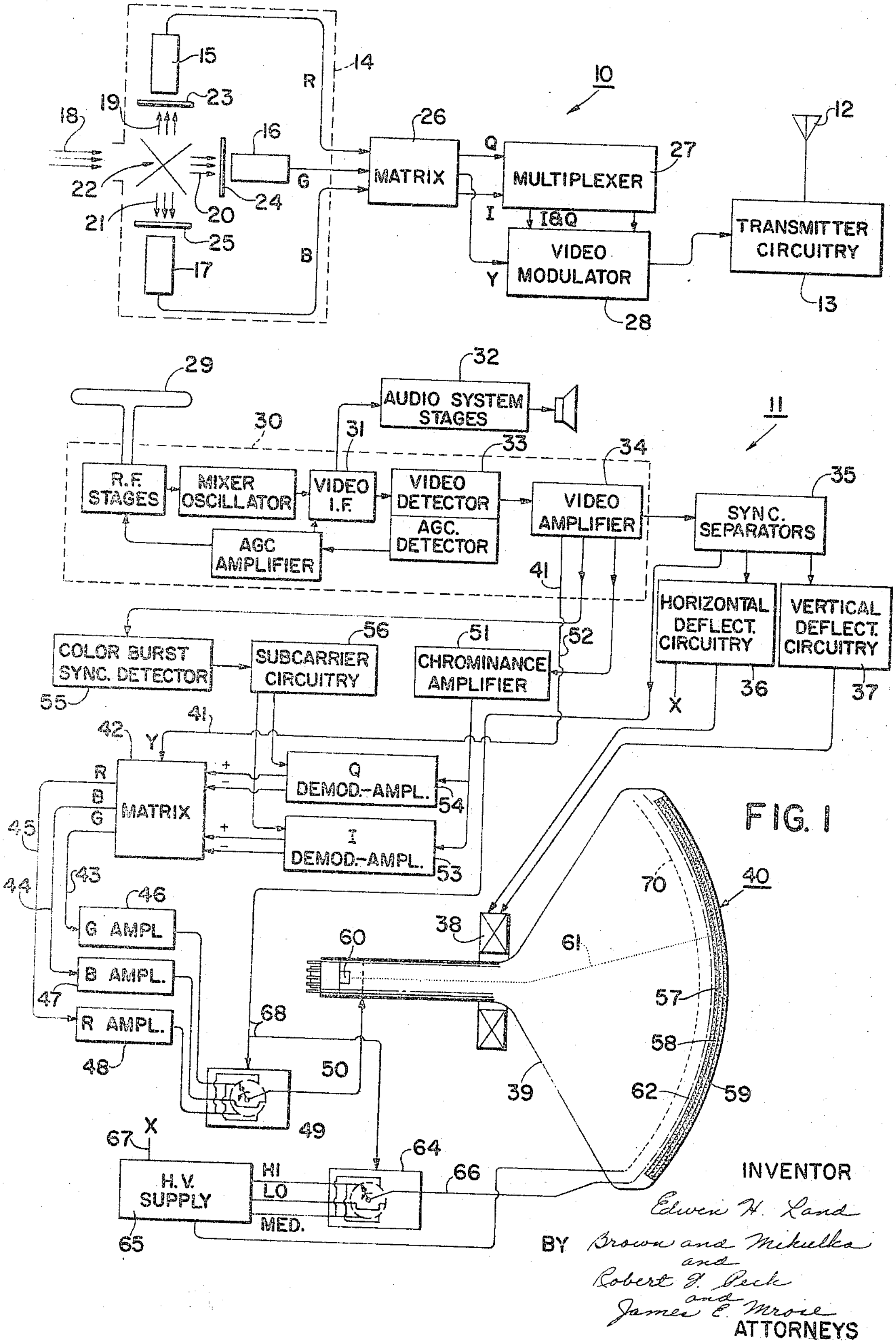
FIGURE 1 represents an improved full-color television system embodying certain of the present teachings, in part in block-diagram and schematic forms.

The embodying arrangement portrayed in FIGURE 1 includes color television transmitting and receiving apparatus, 10 and 11, respectively, which are in generally conventional communication by way of electromagnetic radiations within a prescribed VHF channel. Transmitting antenna 12 is excited by transmitter circuitry 13 of known form adapted to deliver an output modulated to contain the customary five components (audio, video, deflection, chrominance and color burst) for the color signals which are to be radiated. Luminance and chrominance aspects of televised scenes are characterized via a camera assembly 14 which includes the usual three image orthicon or equivalent pickup tubes, 15–17, electrically excited in the customary fashion. Light 18 emanating from a televised scene is shown to be optically resolved into three image beams 19–21 by a mirror array 22, and, thereafter, each beam is passed through a different one of three color filters, 23–25, respectively, before being permitted to impinge upon the sensitive surfaces of its associated pickup tube. One of these filters, 23, passes essentially one color component in the scene, such as its read content falling within the reddish (relatively long) wavelengths of light in the Newtonian spectrum; another filter, 25, passes another color component corresponding to distinguishing different wavelengths, such as the blueish (relatively short) wavelengths; and the third filter, 24, passes a further color component corresponding to the intermediate wavelengths, such as those associated with the color green. It will be recognized that these techniques include those commonly practiced in the generation and transmission of the now-conventional NTSC three-color television signals, and this is a distinct advantage from the standpoint of compatibility, although exploitation of the present teachings is not necessarily restricted to televising which involves the conventional red, green and blue filters. Instead, desired effects are realized when two of the filters view the scene with wavelengths which are relatively far apart, and when the third has wavelength band-pass characteristics distinguishably different from the others. For present purposes, it is important that the three resulting color-separation images, which are characterized in terms of different electrical output signals from the three camera tubes, are images which exhibit different lightness scales for the same scene. Such different lightness scales are of the type observed when different narrow-band filters are successively held to the eye in viewing a colorful scene. The three camera electrical outputs are procesesd by a conventional matrix 26 to produce the standard brightness (I) and chrominance (Q and Y) signals, which are then prepared for transmission by way of a known form of multiplexer 27 and modulator 28.

Within the receiver 11, the VHF radiations intercepted by antenna 29 are applied to a conventional embodiment of receiver circuitry 30, and are there resolved into component signals by equipment of types and forms well known in commercial three-color television receivers. Take-off from the video I.-F. stage 31 delivers sound I.-F. to the audio system stages 32, for example, and the video demodulation products from detector 33 are supplied to an amplifier 34. The latter delivers synchronizing signals to sync separators 35 serving the usual horizontal deflection circuitry, 36, and vertical deflection circuitry, 37, which supply the horizontal and vertical deflection coils of the deflection yoke 38 associated with the picture tube 39 having a unique faceplate structure 40. In addition, a coupling 41 applies to a matrix 42 a composite luminance signal (Y) which corresponds to the summation of the brightness of the color signals derived from all three camera tubes; this matrix of course converts applied signals into three electrical electrical output signals corresponding, in channels 43–45, to the red, green and blue color-separation signals developed at the transmitter by the camera tubes 15–17, respectively. Amplifiers 46–48 prepare the matrix output signals for application to a gating or switching unit 49, which in turn applies appropriate modulating signals to a control grid of picture tube 39 via coupling 50. Although they are conventional, it is perhaps helpful at this juncture to refer briefly to the other chrominance circuits which cooperate by supplying information to matrix 42 for the decoding operations. In this connection, it is to be noted that video amplifier 34 applies a chrominance (video modulation) signal to a chrominance amplifier 51 by way of a coupling 52, and that I and Q signal sideband components in quadrature are thence delivered to the I demodulator-amplifier 53 and Q demodulator-amplifier 54 which ultimately supply I- and Q-related output signals to the matrix. For the latter purposes, color burst signals associated with transmitted horizontal blanking pulses are applied to a color burst sync detector 55 from the video amplifier circuitry 34 and control the phase of the local subcarrier oscillator signal developed within the subcarrier circuitry (oscillator-amplifier) 56. An in-phase output from that circuitry is delivered to the I demodulator-amplifier 53, and a 90-degree out-of-phase output is delivered to the Q demodulator-amplifier 54; video I and Q signals are selectively developed as the result of I and Q sideband combinations with the subcarrier outputs with which they are in phase.

The system as thus far described produces three electrical control signals, in the picture tube grid excitation coupling 50, which are closely related to the three lightness-distribution images of the televised scene as viewed through the three camera filters. In causing the picture tube 39 to generate a display of the same scene in substantially full color, the present teachings very advantageously obviate the need for reproducing the three images in terms of the same colors in which they were viewed, and, further, render the usual point-by-point balancing or ratioing of light outputs relatively non-critical. Instead, the lightness distributions in one of the three images are merely characterized in terms of substantially white light at the face of the picture tube, and the lightness distributions in the second and third images are respectively characterized in terms of colored light of one wavelength, or relatively narrow band of wavelengths, and colored light of a different wavelength or band. The important practical implications of this practice are evidenced by the picture-tube target assembly 40, which is comprised of essentially three layers, 57–59, of light-emitting materials; these layers are coextensive with and preferably supported upon the interior of the glass faceplate of the evacuated tube envelope. Innermost layer 57, nearest the electron gun 60, may comprise a conventional phosphor which emits light of substantially one predetermined color, such as bluish light, in an optimum manner when struck by electrons from beam 61 having a relatively low kinetic energy (i.e., relatively low velocity), as determined by relatively low accelerating potentials applied to the inner conductive (ex. evaporated aluminum) layer 62 which is of a type and form commonly used in picture tube constructions and serves as an accelerating anode. Outer layer 59, nearest the faceplate, efficiently emits light of substantially another predetermined color, such as greenish light, when excited by impinging electrons having a relatively high kinetic energy as determined by relatively high accelerating potentials applied to the anode 62. Intermediate layer 58 responds to impingements of electrons of an intermediate kinetic energy, governed by intermediate levels of potentials on anode 62, by efficiently generating visible light of a color (such as reddish light) which is preferably well removed from the other color from layer 57) in the visible spectrum.

The above arrangement of layers of fluorescent materials involves what, at first, might appear to be a straightforward approach using conventional red-, green- and blue-emitting substances. However, the manner in which these layers are excited instead relies upon and brings into highly useful play the aforementioned mode of color perception. Whereas one might ordinarily expect each of the three layers to be selectively excited to reproduce the same color as that which governs the beam modulation at any instant, that is not the case. By way of distinction, all three of the blue (innermost), red (intermediate) and green (outermost) layers, 57–59, respectively, are simultaneously excited into light emissions when electrons of beam 61 experience maximum acceleration and are modulated by signals characterizing the lightness distribution of the televised scene as viewed through the green (G) camera tube filter 24. This yields one of the three lightness-distribution images in terms of a "primary" of white light. Both the innermost (blue) and intermediate (red) layers 57 and 58 are simultaneously excited when the beam electrons experience an intermediate acceleration and are modulated by signals characterizing the lightness distribution of the scene as viewed through the red (R) camera tube filter 23; the resulting lightness-distribution image is then in terms of a "primary" of magenta light output. Innermost blue layer 57 is alone excited to develop the third lightness-distribution image in blue light, corresponding to the lightness distribution of the scene as viewed through blue filter 25. This particular arrangement and excitation of the fluorescent layers is a preferred one because the blue-emitting layer 57 is innermost and the red-emitting layer 58 is in the intermediate position underlying the green-emitting layer 59. The reasons for this preference are found in considering the relative criticalities, to the viewer, of lightness information in the different colors, and in considering the most faithful reproduction of skin tones and other natural subjects.

The phosphor layer nearest the electron gun will be excited by all the lightness scale images recorded by the three orthicon tubes in the camera. The "retinex" which is predominantly sensitive to the wavelengths emitted by the first phosphor layer will receive three sets of lightness scale information. The "retinex," which is predominantly sensitive to the wavelengths emitted by the second phosphor layer, will receive two sets of lightness scale information. The "retinex," which is predominantly sensitive to the wavelengths of the third phosphor layer, will receive only one set of the lightness scale information.

Since the layer nearest the gun will receive all three sets of information, the corresponding "retinex" will least accurately reproduce the lightness scale as recorded by the orthicon tube. Therefore the innermost phosphor layer should emit light that corresponds with the "retinex" which is least critical to dilution of its lightness scale by two other lightness scales. In like manner the "retinex" which is most sensitive to the intermediate phosphor layer should be the less sensitive to the lightness scale dilution than the layer farthest from the electron gun.

Extensive experiments have shown that changes in the rank order of lightness on the blue retinex will least adversely affect the quality of an image. The reproduction of lightness steps on the red "retinex" is less critical than on the green "retinex." The order of phosphor layers from the gun to the face of the tube thus preferably is blue, red, and green.

Figure 2:
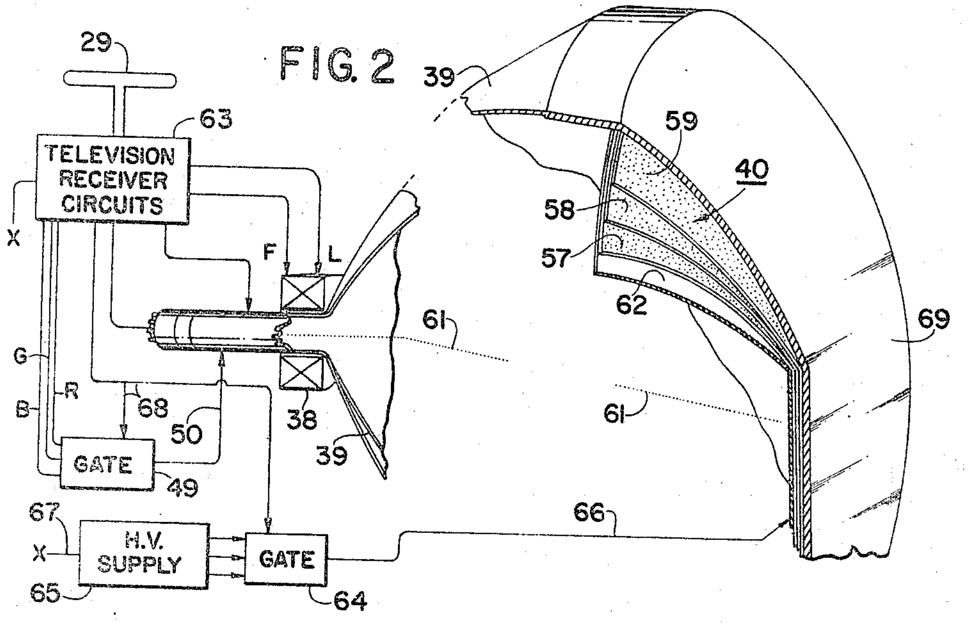
FIG. 2 illustrates color television receiver apparatus including a cut-away portion of a picture tube together with a relatively enlarged fragment of its faceplate assembly.

The television receiver apparatus represented in FIGURE 2 corresponds to that illustrated in connection with the above-described system, and elements which are functional counterparts of those appearing in FIGURE 1 are thus identified by the same reference characters for the purpose of simplifying these disclosures. Block-diagrammed circuitry 63 embodies all networks other than the color- and voltage-gating components. As has already been explained hereinabove, gate 49 serves to switch the red, green and blue lightness-distribution signals to a control electrode of the tube 39, such that the electron beam 61 will be suitably modulated to reproduce corresponding lightness-distribution images in terms of magenta, white and blue light outputs, respectively, from the three-layer screen target 40. In conjunction with this action, the beam-accelerating voltages on anode 62 must likewise be altered, synchronously, such that the televised lightness-distribution image responsive to effects of the red camera tube filter 23 will be reproduced in magenta light outputs under control of the intermediate accelerating potentials which cause the beam to excite two (blue-, and red-emitting) of the layers 57–58; such that the image responsive to effects of the blue camera tube filter 25 will be reproduced in bluish light outputs as controlled by the lowest accelerating potentials which cause the beam to excite the innermost (blue-emitting) layer 57; and such that the image responsive to effects of the green camera tube filter 24 will be reproduced only in substantially white light outputs as controlled by the highest accelerating potentials which cause the beam to excite all three of the layers 57–59. Gate or switch 64 performs this function, and for this purpose is provided with inputs of relatively high, intermediate and low accelerating potentials by a high voltage supply 65; its outputs are applied to anode 62 via coupling 66. In accordance with known practices, the high voltage supply needed for electron-beam acceleration may be associated with the horizontal deflection circuitry, as designated schematically by the coupling 67. The commutating switches or gates 49 and 64 are illustrated (FIGURE 1) schematically in mechanical terms, involving synchronously-rotating contact wipers of a motor-driven type, although preferably the equivalent gating is achieved electronically by exploiting known gating techniques. Couplings 68 establish the needed synchronism of the gating with the synchronizing signal information appearing in circuitry 35 (FIGURE 1), such that the gating may be caused to occur at the field frequency, for example. In other instances, the switching may be caused to occur in known line- or dot-sequential fashion.

Although the target layers 57–59 are depicted as directly superimposed upon one another at the side of the glass faceplate 69, it will be recognized that certain known optically translucent barrier or retardation layers (such as those of zinc sulfide) may be used between the emissive layers to establish optimum accelerating-voltage thresholds for their emissions of light. Moreover, the layers may be made of different thicknesses to improve their operating characteristics. The light-emissive materials used may be various known forms lending themselves to convenient application as layers and to the production of the desired visible wavelengths of outputs, and to responses to electrons having the different kinetic energies involved; selection and application of these may be in accordance with established prior practices and teachings in the art. Outer layers 58 and 59 should be of a transparent or translucent type which transmit light generated behind them to reach the viewer, of course. Inner layers 57 and 58 may each be of a form including numerous well-distributed minute interstices (i.e., each essentially granular, for example) permitting electrons to reach the underlying layers more readily, and thereby enabling the use of relatively low differentials in the stepped accelerating voltages employed to excite the different layers. An inner conductive screen 70 (FIGURE 1) which is close to the target layers and is maintained at a fixed accelerating potential, is useful in preserving essentially fixed accelerating conditions for the electron beam while undergoing horizontal and vertical deflections; misregistration of the images is thereby reduced, and the potential modulations on the more removed anode 62 then serve to alter the electron kinetic energies for purposes of exciting two or three of the layers simultaneously.

Figure 3:
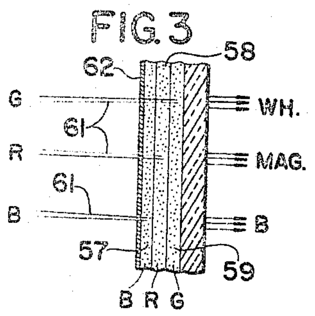
FIG. 3 is a cross-section of a small portion of a picture-tube faceplate having light-emitting materials arranged in three layers and illustrating a preferred arrangement of layers wherein each emits a different one of substantially green, red and blue light to produce lightness-distribution images in terms of substantially white, blue and magenta wavelengths.

In FIGURE 3, the penetrations and excitations by electron beam 61 are illustrated for the three conditions of accelerating potentials applied to anode coating 62, and it should of course be appreciated that the excitations of only the first (innermost) layer, of the first and second (intermediate) layers simultaneously, and of the first, second, and third (outermost) layers simultaneously, are the result of the relatively low, intermediate, and relatively high accelerating potentials, respectively. Beam modulations characterizing the lightness-distribution images of the televised scene as viewed by the camera tubes through the green (G), blue (B) and red (R) filters yield the substantially white (WH.), blue (B) and magenta (MAG.) points of light outputs which are shown in FIGURE 3. However, the three full lightness-distribution images reproduced across the expanse of the faceplate in this manner occasion sensation of substantially the same full gamut and distribution of colors as appear in the original scene. This quality of color reproduction results from the aforementioned assimulation of three sets of lightness information by the three "retinexes" of the visual system. The differences in lightness values are used to reproduce the colors of the original scene. Importantly, the three reproduced images are in non-classical "primary colors" and their lightness distributions may have widely different energy levels, without upsetting the color perceptions, inasmuch as it is not the mixing of energies, point-by-point, but the correlations of image lightness, upon which the perception is based.

The same types of substantially red-, green- and blue-emitting layers are arranged and excited differently in the embodiments portrayed in FIGURES 4–8, and, in each instance, excitation of all three layers simultaneously yields one of the three lightness-distribution "primary" images in terms of substantially white light. In FIGURE 4, the innermost layer 57*a* is red-emitting when characterizing the red lightness-distribution image of the televised scene, and the intermediate green-emitting layer 58*a* contributes to the yellow "primary" output when the first two layers are simultaneously excited to characterize the green lightness-distribution image. In FIGURE 5, the innermost blue-emitting layer 57*b* alone characterizes the blue lightness-distribution image, and is joined by the intermediate green-emitting layer 58*b* in characterizing the green lightness-distribution image in a cyan light output. Red-emitting layer 57*c* in FIGURE 6 responds alone to the televised red lightness-distribution image, and, together with the intermediate blue-emitting layer 58*c*, produces a magenta "primary" output to characterize the televised blue lightness-distribution image. Green-emitting layer 57*d* in FIGURE 7 responds alone to the televised green lightness-distribution image, and, together with the intermediate blue-emitting layer 58*d*, produces a cyan "primary" output to characterize the televised blue lightness-distribution image. In FIGURE 8, the green-emitting layer 57*e* responds alone to the televised green lightness-distribution image, and, together with the intermediate red-emitting layer 58*e*, produces a yellow "primary" output to characterize the televised red lightness-distribution image.

Any of the illustrated arrangements may be used to produce black-and-white displays only. In those cases where white light results from simultaneous excitation of the three layers, the maximum accelerating potential is maintained during reception of black-and-white picture information; manual switching may be employed to achieve this end, or, instead the system may utilize so-called "color killer" circuitry to detect absence of color burst signals and automatically disable the color gating while applying the black-and-white modulation and fixed maximum accelerating potential to the picture tube.

There are numerous departures which may be made from the specific practices and constructions which have been thus far described, within the purview of the same teachings. Layer thicknesses and densities may be different, for example, as in the case of an intermediate red-emitting layer which is twice the thickness of an innermost blue-emitting layer. Although fluorescent layers are ting layer which is four times the thickness of the innermost blue-emitting layer. Although fluorescent layers are currently preferred, an alternative arrangement may involve a layer of multiple-coat grains of phosphor, such as grains each having a green-emitting phosphor center, a coating of red-emitting phosphor around the center, and an outer coating of blue-emitting phosphor, preferably with intervening barrier layers. Phosphor-poisoning techniques, barrier layers, and strip masking elements may also be used to regulate the light emissions of screen materials, the latter not requiring changes in accelerating potentials to alter color, although involving registration complexities. In addition, the three fluorescent layers may all be white-emitting and may be associated with two filters (ex. a blue filter between the innermost and intermediate layers, and a magenta filter between the intermediate and outermost layers) to produce like results. The invention is not restricted to uses involving cathode ray tube display devices, and, by way of example, may be associated with electroluminescent type displays exploiting the same concepts. Accordingly, it should be understood that the embodiments and practices described and portrayed have been presented by way of disclosure, rather than limitation, and that various modifications, substitutions and combinations may be effected without departure from the spirit and scope of this invention in its broader aspects.

What is claimed is:

1. Apparatus for reproducing a subject as a display color, comprising means producing a first visible displa in substantially white light, of the lightness distributic of the subject as it appears in terms of first predetermin visible wavelengths, means producing a second visib display, substantially in registration with said first di play and in first colored light, of the lightness distrib tion of the same subject as it appears in terms of secor predetermined visible wavelengths, and means producir a third visible display, substantially in registration wi said first and second displays and in second colore light, of the lightness distribution of the same subject a it appears in terms of third predetermined visible wav lengths, whereby substantially stable chromaticity of tl reproduced subject is realized substantially independen ly of relative brightness of said first, second and thir visible displays.

2. Apparatus for reproducing a subject as a display i color, comprising means producing a first visible di play, in substantially white light, of the lightness di tribution of the subject as it appears in terms of fir predetermined visible wavelengths, means producing second visible display, substantially in registration wit said first display and in first colored light, of the ligh ness distribution of the same subject as it appears i terms of second predetermined visible wavelengths, an means producing a third visible display, substantially i registration with said first and second displays and i second colored light including said first colored light, o the lightness distribution of the same subject as it ap pears in terms of third predetermined visible wavelength whereby substantially stable chromaticity of the repro duced subject is realized substantially independently o relative brightness of said first, second and third visibl displays.

3. Apparatus for reproducing a subject as a displa in color, as set forth in claim 2, wherein said first an second colored lights are essentially of different ones o relatively long and relatively short wavelengths of visibl light.

4. Apparatus for reproducing a subject as a displa in color, as set forth in claim 2, wherein said first colore light provided by said means producing said second dis play is substantially blue light.

5. Apparatus for reproducing a subject as a display i color, as set forth in claim 4, wherein said second colore light provided by said means producing said third displa includes substantially red light.

6. Apparatus for reproducing a subject as a display ir color, as set forth in claim 5, wherein said means producing said first display includes means independently producing substantially green light, substantially blue light and substantially red light to characterize said lightness distribution of the subject as it appears in terms of said first predetermined visible wavelengths.

7. Apparatus for reproducing a subject as a display in color, as set forth in claim 2, wherein said first, second and third predetermined visible wavelengths are essentially in different ones of relatively long, middle and short wave sections of the visible spectrum.

8. Apparatus for reproducing a subject as a display in color, comprising means producing a first visible display, in three colors of light which combine to produce substantially white resultant light, of the lightness distribution of the subject as it appears in terms of first predetermined visible wavelengths, means producing a second visible display, substantially in registration with said first display and in one of said three colors of light, of the lightness distribution of the same subject as it appears in terms of second predetermined visible wavelengths, and means producing a third visible display, substantially in registration with said first and second displays and in two of said three colors of light, of the lightness distribution of the same subject as it appears in terms of third predetermined visible wavelengths, whereby substantially stable chromaticity of the reproduced subject is realized substantially independently of relative brightnesses of said first, second and third visible displays.

9. Apparatus for reproducing a subject as a display in color, as set forth in claim 7 wherein said three colors of light comprise substantially red, green and blue light, and wherein said first, second and third predetermined visible wavelengths are essentially in different ones of relatively long, middle and short wave sections of the visible spectrum.

10. Color television apparatus comprising television camera means producing electrical signals characterizing three different lightness-distributions of the televised scene as they appear in terms of first, second and third predetermined visible wavelengths, and means responsive to said electrical signals producing a first visible display in substantially white light of the lightness-distribution of the scene as it appears in terms of said first visible wavelengths, and producing a second visible display, substantially in registration with said first display and in first colored light, of the lightness distribution of the scene as it appears in terms of said second visible wavelengths, and means producing a third visible display, substantially in registration with said first and second displays and in second colored light, of the lightness-distribution of the same scene as it appears in terms of said third visible wavelengths, whereby substantially stable chromaticity of the reproduced scene is realized substantially independently of relative brightnesses of said first, second and third visible displays.

11. Color television apparatus comprising television camera means producing electrical signals characterizing three different records of the televisied scene each representing a different one of three different lightness-distributions of the televised scene as they appear in terms of first, second and third predetermined visible wavelengths, receiver means, and transmission means transmitting to said receiver means television signals characterizing said electrical signals, said receiver means including first means translating the information in said television signals characterizing one of said records into a first image of the scene in substantially white light, second means translating the information in said television signals characterizing a second one of said records into a second image of the same scene substantially in registration with said first image and in first colored light, and third means translating the information in said television signals characterizing a third one of said records into a third image of the same scene substantially in registration with said first and second images and in second colored light, whereby substantially stable chromaticity of the reproduced scene is realized substantially independently of relative brightnesses of said first, second and third images.

12. Color television apparatus for reproducing a televised scene from television signals characterizing three different records of the televised scene each representing a different one of three different lightness-distributions of the televised scene as they appear in terms of first, second and third predetermined visible wavelengths, comprising first means translating the information in said television signals characterizing one of said records into a first image of the scene in substantially white light, second means translating the information in said television signals characterizing a second one of said records into a second image of the same scene substantially in registration with said first image and in first colored light, and third means translating the information in said television signals characterizing a third one of said records into a third image of the same scene substantially in registration with said first and second images and in second colored light, whereby substantially stable chromaticity of the reproduced scene is realized substantially independently of relative brightnesses of said first, second and third images.

13. Color television apparatus as set forth in claim 12 wherein said first, second and third translating means comprise first, second and third image-forming means each having fluorescent material, fluorescent material of said second image-forming means emitting said first colored light, and fluorescent material of said third image-forming means emitting colored light different from said first colored light, and means exciting the fluorescent materials of said image-forming means into emissions of light, said exciting means including means for selectively exciting the material of said second image-forming means to emit said first colored light to produce said second image, and means for selectively exciting the materials of said second and third image-forming means simultaneously to emit said second colored light to produce said third image.

14. Color television apparatus as set forth in claim 13 wherein said receiver means includes a cathode ray tube, wherein said exciting means comprises electron gun means in said cathode ray tube for exciting the fluorescent materials of said image-forming means, and means controlling said electron gun means to selectively excite one, two simultaneously, and three simultaneously, of said fluorescent materials to selectively produce different ones of said three images.

15. Color television apparatus as set forth in claim 12 wherein said first, second and third translating means comprise first, second and third image-forming means each having fluorescent material, and means exciting the fluorescent materials of said image-forming means into emissions of light, said exciting means including means for selectively exciting the materials of said first, second and third image-forming means simultaneously to produce said first image in substantially white light.

16. Color television apparatus as set forth in claim 13 wherein said exciting means further includes means for selectively exciting the materials of said first, second and third image-forming means simultaneously to produce said first image in substantially white light.

17. Color television apparatus as set forth in claim 14 wherein a different fluorescent material is associated with each of said three image-forming means and is substantially uniformly distributed over the raster area at the face of said cathode ray tube, and wherein each of the different fluorescent materials is selectively excited into substantial emissions of visible light by electrons from said gun means having at least a predetermined different minimum level of kinetic energy.

18. Color television apparatus as set forth in claim 17 wherein each of said different fluorescent materials emits light in essentially a different one of relatively long, middle and short wave sections of the visible spectrum, wherein light emissions from the three of said different fluorescent materials combine to produce substantially white light, and wherein said exciting means includes means for selectively exciting said three materials simultaneously to produce said first image in substantially white light.

19. Color television apparatus as set forth in claim 18 wherein each of said different fluorescent materials emits a different one of substantially red, green and blue light, wherein electrons from said gun means having at least the highest of said minimum levels of kinetic energy excite all three of said materials into substantial light emissions, wherein electrons from said gun means having at least an intermediate minimum level but less than the highest minimum level of kinetic energy excite both the blue-emitting and red-emitting materials into substantial light emissions simultaneously, and wherein electrons from said gun means having at least the lowest minimum level but less than the intermediate minimum level of kinetic energy excite the blue-emitting material alone into substantial light emissions.

20. Color television apparatus as set forth in claim 18 wherein said different ones of different fluorescent materials are distributed in three proximately-disposed layers, wherein electrons from said gun means having at least the highest of said minimum levels of kinetic energy excite all three of said layers into substantial light emissions, wherein electrons from said gun means having at least an intermediate minimum level but less than the highest minimum level of kinetic energy excite both the innermost layer nearest said gun means and the intermediate layer into substantial light emissions, and wherein electrons from said gun means having at least the lowest minimum level but less than the intermediate minimum level of kinetic energy excites said innermost layer alone into substantial light emissions.

21. Color television apparatus as set forth in claim 20 wherein said innermost layer emits substantially blue light, wherein said intermediate layer emits substantially red light, and wherein the outermost layer most remote from said gun means emits substantially green light.

22. Color television apparatus as set forth in claim 21 wherein said electron gun controlling means selectively excites all three of said layers simultaneously to characterize said one of said records as said first image in substantially white light, and selectively excites said innermost layer alone to characterize said second one of said records as said second image, and selectively excites said innermost and intermediate layers simultaneously to characterize said third one of said records as said third image and wherein said one, second one, and third one of said records represents the lightness distributions of the televised scene as they appear in terms of middle, relatively long, and relatively short wave sections, respectively, of the visible spectrum.

23. Color televison apparatus for reproducing a televised scene from television signals characterizing three different records of the televised scene each representing a different one of three different lightness-distributions of the televised scene as they appear in terms of first, second and thrid predetermined visible wavelengths, comprising first translating means including first fluorescent material for emitting first colored light, said first translating means translating the information in said television signals characterizing one of said records into a first image of the scene in said first colored light from said first fluorescent material, second translating means including second fluorescent material for emitting second colored light, said second translating means translating the information in said television signals characterizing a second one of said records into a second image of the same scene substantially in registration with said first image and in both said first colored light from said first material and said second colored light from said second material simultaneously, and third translating means including third fluorescent material, said third translating means translating the information in said television signals characterizing a third one of said records into a third image of the same scene substantially in registration with said first and second images and simultaneously in all of said first colored light from said first material, said second colored light from said second material, and said third colored light from said third material, said first, second and third colored lights comprising different ones of substantially red, green and blue light.

24. Color television apparatus as set forth in claim 23, wherein said receiver means includes a cathode ray tube having electron gun means for exciting said first, second and third fluorescent materials, wherein said first, second and third materials are distributed in different ones of three proximately-disposed layers, wherein said first, second and third translating means include means controlling said electron gun means to selectively excite one, two simultaneously, and three simultaneously of said layers to selectively produce different ones of said images.

25. Color television apparatus as set forth in claim 24 wherein the fluorescent material of the one of said layers most remote from said electron gun means emits substantially green light.

26. Color television apparatus as set forth in claim 25, wherein the fluorescent material of the one of said layers nearest said electron gun emits substantially blue light.

27. The method of producing displays of a subject in color which comprises producing a first visible display, in substantially white light, of the lightness distribution of a subject as it appears in terms of first predetermined visible wavelengths, producing a second visible display, substantially in registration with the first display and in first colored light, of the lightness distribution of the same subject as it appears in terms of second predetermined visible wavelengths, and producing a third visible display, substantially in registration with the first and second displays and in second colored light, of the lightness distribution of the same subject as it appears in terms of third predetermined visible wavelengths, whereby substantially stable chromaticity of the reproduced subject is realized substantially independently of the relative brightness of said first, second and third visible displays.

28. The method of reproducing a televised scene in color which comprises producing electrical signals characterizing three different records of the televised scene each characterizing a different one of three lightness-distributions of the scene as they appear in terms of first, second and third predetermined visible wavelengths, translating the information in said signals characterizing one of the records into a first image of the scene in substantially white light, translating the information in said signals characterizing a second of the records into a second image of the same scene substantially in registration with the first image in first colored light, from essentially one of the long, middle and short wave sections of the visible spectrum and translating the information in said signals characterizing a third of the records into a third image of the same scene substantially in registration with the first and second images and in second colored light which includes the first colored light and light from essentially another one of the long, middle and short wave sections of the visible spectrum, whereby to realize substantially stable chromaticity of the reproduced scene substantially independently of relative brightness of the three images.

References Cited by the Examiner

UNITED STATES PATENTS

| | | | |
|---|---|---|---|
| 3,204,143 | 8/1965 | Pritchard | 178—5.4 |
| 3,242,260 | 3/1966 | Cooper et al. | 178—5.4 |
| 3,271,512 | 9/1966 | Daw | 178—5.4 |

DAVID G. REDINBAUGH, *Primary Examiner.*

J. A. O'BRIEN, *Assistant Examiner.*